United States Patent
Gamon et al.

(10) Patent No.: US 9,251,473 B2
(45) Date of Patent: Feb. 2, 2016

(54) IDENTIFYING SALIENT ITEMS IN DOCUMENTS

(71) Applicant: Microsoft Corporation, Redmond, WA (US)

(72) Inventors: Michael Gamon, Seattle, WA (US); Patrick Pantel, Bellevue, WA (US); Xinying Song, Bellevue, WA (US); Tae Yano, Pittsburgh, PA (US); Johnson Tan Apacible, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 271 days.

(21) Appl. No.: 13/798,198

(22) Filed: Mar. 13, 2013

(65) Prior Publication Data

US 2014/0279730 A1  Sep. 18, 2014

(51) Int. Cl.
*G06N 99/00* (2010.01)
*G06F 17/30* (2006.01)

(52) U.S. Cl.
CPC ........ *G06N 99/005* (2013.01); *G06F 17/30864* (2013.01)

(58) Field of Classification Search
CPC .................................................. G06N 99/005
See application file for complete search history.

(56) References Cited

U.S. PATENT DOCUMENTS

| | | | |
|---|---|---|---|
| 6,938,025 | B1 | 8/2005 | Lulich et al. |
| 7,769,740 | B2 | 8/2010 | Martinez et al. |
| 8,065,307 | B2 | 11/2011 | Haslam et al. |
| 2003/0014399 | A1 | 1/2003 | Hansen et al. |

OTHER PUBLICATIONS

P. Capasso et al., "A Semantic Topic Identification System for Document Retrieval on the Web", Proc. IEEE 7th Int'l Conf. on Web—Age Info. Mgmt. Workshops, 2006, 8 pages.*
S. Subramoniam and J. John, "Algorithms for Community Subject Identification: Experiments and Test Results", Proc. IEEE Int'l Conf. on e-Technology and e-Service, 2004, 7 pages.*
K. Nikolaev et al., "Combining Anchor Text Categorization and Graph Analysis for Paid Link Detection", Proc. ACM WWW 2009, pp. 1105-1106.*

(Continued)

*Primary Examiner* — Kakali Chaki
*Assistant Examiner* — Vincent Gonzales
(74) *Attorney, Agent, or Firm* — Steve Wight; Sandy Swain; Micky Minhas

(57) ABSTRACT

A set of representations of item-page pairs of items and respective web pages that include the respective items is obtained, each representation including feature function values indicating weights associated with features of associated web pages, the features including page classification features. An annotated set of labeled training data that is annotated with salience annotation values of items for respective web pages that include the items is obtained. The salience annotation values are determined based on a soft function, by determining a first count of a total number of user queries associated with corresponding visits to the respective web pages, and determining a ratio of a second count to the first count, the second count determined as a cardinality of a subset of the corresponding visits that are associated with user queries that include the item, the subset included in the corresponding visits. Models are trained using the annotated set.

20 Claims, 9 Drawing Sheets

(56) References Cited

OTHER PUBLICATIONS

Upstill, Trystan Garrett, "Document Ranking Using Web Evidence", retrieved Jan. 28, 2013 at http://www.webir.org/resources/phd/Upstill_2005.pdf, Thesis Submitted for the Degree of Doctor of Philosophy at the Australian National University, May 2005, 244 pages.

Zeng, et al., "Learning to Cluster Web Search Results", Retrieved Jan. 25, 2013 at <<http://www.icst.pku.edu.cn/course/mining/11-12spring/%E5%8F%82%E8%80%83%E6%96%87%E7%8C%AE/05-03%20Learning%20to%20Cluster%20Web%20Search%20Results.pdf>>, In Proceedings of the 27th Annual International ACM SIGIR Conference on Research and Development in Information Retrieval, Jul. 25, 2004, 8 pages.

Moens, et al., "Measuring Aboutness of an Entity in a Text", Retrieved Jan. 28, 2013 <<http://acl.ldc.upenn.edu/W/W06/W06-3804.pdf>>, In Proceedings of the First Workshop on Graph Based Methods for Natural Language Processing, Jun. 2006, 4 pages.

Deschacht, et al., "Text Analysis for Automatic Image Annotation", Retrieved Jan. 25, 2013 at http://acl.ldc.upenn.edu/P/P07/P07-1126.pdf>>, In Proceedings of the 45th Annual Meeting of the Association for Computational Linguistics, Jun. 2007, 8 pages.

Barzilay, et al., "Modeling Local Coherence: An Entity-based Approach", Retrieved Jan. 25, 2013 at <<http://www.aclweb.org/anthology-new/J/J08/J08-1001.pdf>>, In Proceedings of the 43rd Annual Meeting on Association for Computational Linguistics, Jun. 2005, 8 pages.

Agichtein, et al., "Improving Web Search Ranking by Incorporating User Behaviour Information", Retrieved Jan. 28, 2013 at http://www.mathcs.emory.edu/~eugene/papers/sigir2006ranking.pdf>>, In Proceedings of the 29th Annual International ACM SIGIR Conference on Research and Development in Information Retrieval, Aug. 6, 2006, 8 pages.

Baeza-Yates, Ricardo, "Web Usage Mining in Search Engines", Retrieved Jan. 28, 2013 at <<http://db.uwaterloo.ca/db_seminars/notes/ricardo.pdf>>, In Web Mining: Applications and Techniques, 2005, 13 pages.

Blei, et al., "Latent Dirichlet Allocation", retrieved Jan. 28, 2013 at <<http://www.cs.princeton.edu/~blei/papers/BleiNgJordan2003.pdf>>, In Journal of Machine Learning Research, vol. 3, Jan. 2003, 30 pages.

Bruza, et al., "Aboutness from a Commonsense Perspective", retrieved Jan. 28, 2013 at <<http://citeseerx.ist.psu.edu/viewdoc/download?doi=10.1.1.21.957&rep=rep1&type=pdf>>, In Journal of the American Society for Information Science; vol. 51, Issue 12, Oct. 2000, 21 pages.

Cai, et al., "Extracting Content Structure for Web Pages Based on Visual Representation", Retrieved Jan. 28, 2013 at <<http://www.dbs.ifi.lmu.de/~spyu/paper/VIPS-APWeb.pdf>>, In Proceedings of the 5th Asia-Pacific Web Conference on Web technologies and Applications, Apr. 2003, 12 pages.

Collins, Michael, "Discriminative Training Methods for Hidden Markov Models: Theory and Experiments with Perceptron Algorithms", Retrieved Jan. 28, 2013 at <<http://acl.ldc.upenn.edu/W/W02/W02-1001.pdf>>, In Proceedings of the Conference on Empirical Methods in Natural Language Processing, Jul. 2002, 8 pages.

Cucerzan, Silviu, "Large-Scale Named Entity Disambiguation Based on Wikipedia Data", Retrieved Jan. 25, 2013 at http://acl.ldc.upenn.edu/D/D07/D07-1074.pdf>>, In Proceedings of the Joint Conference on Empirical Methods in Natural Language Processing and Computational Natural Language Learning, Jun. 2007, 9 pages.

Dalvi, et al., "A Web of Concepts", Retrieved Jan. 28, 2013 at <<http://www.tomkinshome.com/site_media/papers/papers/DKP+09.pdf>>, In Proceedings of the Twenty-Eighth ACM SIGMOD-SIGACT-SIGART Symposium on Principles of Database Systems, Jun. 2009, 12 pages.

Finkel, et al., "Incorporating Non-local Information into Information Extraction Systems by Gibbs Sampling", retrieved Jan. 25, 2013 at <<http://nlp.stanford.edu/~manning/papers/gibbscrf3.pdf>>, In Proceedings of the 43rd Annual Meeting on Association for Computational Linguistics, Jun. 25, 2005, 8 pages.

Friedman, Jerome H., "Greedy Function Approximation: A Gradient Boosting Machine", Retrieved Jan. 25, 2013 at <<http://luthuli.cs.uiuc.edu/~daf/courses/Optimization/Papers/2699986.pdf>>, The Annals of Statistics, vol. 29, Issue 5, Oct. 2001, 45 pages.

Holland, et al., "Preference Mining: A Novel Approach on Mining User Preferences for Personalized Applications", Retrieved Jan. 25, 2013 at <<http://www.cs.sfu.ca/~ester/papers/PKDD2003-PreferenceMining.pdf>>, In Proceedings of 7th European Conference on Principles and Practice of Knowledge Discovery in Databases, Sep. 22, 2003, 12 pages.

Hovy, et al., "Automated Text Summarization and the Summarist System", Retrieved Jan. 25, 2013 at <<http://acl.ldc.upenn.edu/X/X98/X98-1026.pdf>>, In Proceedings of a Workshop on Held at Baltimore, Maryland, Oct. 13, 1998, 18 pages.

Hulth, Anette, "Improved Automatic Keyword Extraction Given More Linguistic Knowledge", Retrieved Jan. 28, 2013 at <<http://acl.ldc.upenn.edu/acl2003/emnlp/pdf/Hulth.pdf>>, In Proceedings of the Conference on Empirical methods in Natural Language Processing, Jul. 11, 2003, 8 pages.

Hutchins, W. John, "On the Problem of 'Aboutness' in Document Analysis", Retrieved Jan. 25, 2013 at <<http://comminfo.rutgers.edu/~muresan/614_IR/2004_Fall/Resources/Docs/jinfHutchins1977.pdf>>, In Journal of Informatics, vol. 1, Issue 1, Apr. 1997, 16 pages.

Irmak, et al., "Contextual Ranking of Keywords Using Click Data", Retrieved Jan. 25, 2013 at <<http://making.csie.ndhu.edu.tw/seminar/making/papers/PDF/Contextual%20Ranking%20of%20Keywords%20Using%20Click%20Data.pdf>>, In Proceedings of the IEEE International Conference on Data Engineering, Mar. 29, 2009, 12 pages.

Joachims, Thorsten, "Optimizing Search Engines using Clickthrough Data", retrieved Jan. 25, 2013 at <<http://citeseerx.ist.psu.edu/viewdoc/download?doi=10.1.1.12.3161&rep=rep1&type=pdf>>, In Proceedings of the Eighth International Conference on Knowledge Discovery and Data Mining, Jul. 23, 2002, 10 pages.

Joachims, et al., "Accurately Interpreting Clickthrough Data as Implicit Feedback", Retrieved Jan. 25, 2013 at <<http://citeseerx.ist.psu.edu/viewdoc/download?doi=10.1.1.147.2481&rep=rep1&type=pdf>>, In Proceedings of the 28th Annual International ACM SIGIR Conference on Research and Development in Information Retrieval, Aug. 15, 2005, 8 pages.

Komachi, et al., "Minimally Supervised Learning of Semantic Knowledge from Query Logs", Retrieved Jan. 25, 2013 at <<http://newdesign.aclweb.org/anthology-new/I/I08/I08-1047.pdf>>, In Proceedings of the 28th Annual International ACM SIGIR Conference on Research and Development in Information Retrieval, Jan. 2008, 8 pages.

Kupiec, et al., "A Trainable Document Summarizer", Retrieved Jan. 25, 2013 at <<http://www.csie.ntnu.edu.tw/~g96470318/A_trainable_document_summarizer_.pdf>>, In Proceedings of the 18th Annual International ACM SIGIR Conference on Research and Development in Information Retrieval, Jul. 9, 1995, 6 pages.

Landauer, et al., "A Solution to Plato's Problem: The Latent Semantic Analysis Theory of Acquisition, Induction, and Representation of Knowledge", Retrieved Jan. 28, 2013 at <<http://www.stat.cmu.edu/~cshalizi/350/2008/readings/Landauer-Dumais.pdf>>, Psychological Review, vol. 104, Issue 2, Apr. 1997, 30 pages.

Manning, et al., "Introduction to Information Retrieval", Retrieved Jan. 28, 2013 at <<http://nlp.stanford.edu/IR-book/pdf/irbookonlinereading.pdf>>, Cambridge University Press, 2009, 581 pages.

Marcu, Daniel, "From Discourse Structures to Text Summaries", retrieved Jan. 25, 2013 at <<http://acl.ldc.upenn.edu/W/W97/W97-0713.pdf>>, In Proceedings of the ACL/EACL: Workshop on Intelligent Scalable Text Summarization, Jul. 11, 1997, 7 pages.

(56) References Cited

OTHER PUBLICATIONS

Muralidharan, et al., "Social Annotations in Web Search", Retrieved Jan. 28, 2013 at <<http://static.googleusercontent.com/external_content/untrusted_dlcp/research.google.com/en//pubs/archive/38116.pdf>>, In Proceedings of the SIGCHI Conference on Human Factors in Computing Systems, May 5, 2012, 10 pages.

Pantel, et al., "Social Annotations: Utility and Prediction Modeling", Retrieved Jan. 25, 2013 at <<http://www.patrickpantel.com/download/papers/2012/sigir12.pdf>>, In Proceedings of the 35th International ACM SIGIR Conference on Research and Development in Information Retrieval, Aug. 12, 2012, 10 pages.

Pasca, et al., "What You Seek is What you Get: Extraction of Class Attributes from Query Log", retrieved Jan. 25, 2013 at <<http://www.aaai.org/Papers/IJCAI/2007/IJCAI07-455.pdf>>, In Proceedings of the 20th International Joint Conference on Artifical Intelligence, Jan. 2007, 6 pages.

Radlinski, et al., "Query Chains: Learning to Rank from Implicit Feedback", retrieved Jan. 28, 2013 at <<http://arxiv.org/pdf/cs/0605035.pdf>>, In Proceedings of the Eleventh ACM SIGKDD International Conference on Knowledge Discovery in Data Mining, Aug. 21, 2005, 10 pages.

Salton, et al., "Approaches to Passage Retrieval in Full Text Information Systems", Retrieved Jan. 28, 2013 at <<http://www.inf.ed.ac.uk/teaching/courses/tts/papers/salton93approaches.pdf>>, In Proceedings of the 16th Annual International ACM SIGIR Conference on Research and Development in Information Retrieval, Jun. 1993, 10 pages.

Salton, et al., "Term-Weighting Approaches in Automatic Text Retrieval", retrieved at <<http://citeseerx.ist.psu.edu/viewdoc/download?doi=10.1.101.9086&rep=rep1&type=pdf>>, In Journal of Information Processing & Management, vol. 24, Issue 5, 1988, 11 pages.

Salton, et al., "A Vector Space Model for Automatic Indexing", Retrieved Jan. 28, 2013 at <<http://comminfo.rutgers.edu/~muresan/Courses/Spring2004/551_IR/Resources/Docs/cacmSalton1975.pdf>>, In Communications of the ACM, vol. 18, Issue 11, Nov. 1975, 8 pages.

Song, et al., "Learning Block Importance Models for Web Pages", Retrieved Jan. 28, 2013 at <<http://citeseerx.ist.psu.edu/viewdoc/download?doi=10.1.1.69.4681&rep=rep1&type=pdf>>, In Proceedings of the 13th International Conference on World Wide Web, May 17, 2004, 9 pages.

Xu, et al., "Named Entity Mining from Click-Through Data using Weakly Supervised Latent Dirichlet Allocation", Retrieved Jan. 28, 2013 at <<http://www.cc.gatech.edu/~syang46/papers/kdd09.pdf>>, In Proceedings of the 15th ACM SIGKDD International Conference on Knowledge Discovery and Data Mining, Jun. 28, 2009, 9 pages.

Yih, et al., "Finding Advertising Keywords on Web Pages", Retrieved Jan. 28, 2013 at <<http://www2006.org/programme/files/pdf/533.pdf>>, In proceedings of the 15th International Conference on World Wide Web, May 23, 2006, 10 pages.

Zhu, Xiaojin, "Semi-Supervised Learning Literature Survey", retrieved Jan. 25, 2013 at <<http://citeseerx.ist.psu.edu/viewdoc/download?doi=10.1.1.99.9681&rep=rep1&type=pdf>>, Retrieved Date: Jan. 25, 2013, 59 pages.

Paranjpe, Deepa, "Learning Document Aboutness from Implicit User Feedback and Document Structure," Proceedings of the 18th ACM Conference on Information and Knowledge Management (CIKM '09), Nov. 2-6, 2009, pp. 365-374.

"Supervised learning," Retrieved Feb. 22, 2013 at <<http://en.wikipedia.org/wiki/Supervised_learning>>, Wikipedia, 7 pages.

Wang, et al., "Extracting Search-Focused Key N-Grams for Relevance Ranking in Web Search," Retrieved Feb. 19, 2013 at <<http://research.microsoft.com/en-us/people/hangli/wsdm030-wang.pdf>>, Fifth ACM International Conference on Web Search and Data Mining (WSDM'12), Feb. 8-12, 2012, 10 pages.

"International Search Report & Written Opinion for PCT Patent Application No. PCT/US2014/020455", Mailed Date: Jun. 17, 2014, Filed Date: Mar. 5, 2014, 14 Pages.

Nie, et al., "Learning Document Labels from Enriched Click Graphs", In IEEE International Conference Data Mining Workshops, Dec. 13, 2010, pp. 57-64.

Janssens, et al., "Hybrid Clustering for Validation and Improvement of Subject-Classification Schemes", In Information Processing & Management, vol. 45, Issue 6, Nov. 2009, pp. 683-702.

Perner, Petra, "Methods for Data Mining", In Book: Data Mining on Multimedia Data, Jan. 1, 2002, 75 Pages.

Hakkani-Tur, et al., "Employing Web Search Query Click Logs for Multi-domain Spoken Language Understanding", In IEEE Workshop on Automatic Speech Recognition and Understanding, Dec. 11, 2011, pp. 419-424.

"International Preliminary Report on Patentability for PCT Patent Application No. PCT/US2014/020455", Mailed Date: Jun. 6, 2015, Filed Date: Mar. 5, 2014, 15 Pages.

\* cited by examiner

200

| Class | Family | Description |
|---|---|---|
| $F_{e;D}$ Corpus Features | | tf, df, idf, tf.idf of e in D<br>same in D2 where D2 includes the documents in the top domain of d |
| $F_d$ | Page Classification | page category of d<br>junk page score of d<br>inlink spam page score<br>spam page confidence |
| | URL | top level domain<br>URL depth |
| | Length | length of d<br>length of main content of d |
| $F_{e;d}$ | Structural | e is in the title<br>e is in a meta key word<br>e is in the visual title<br>e is in bold font<br>e is in emphasized font<br>e is in italics<br>norm freq of e in table headers<br>norm freq of e in table body<br>norm freq of e in list body<br>norm freq of e in text<br>norm freq of e in title<br>norm freq of e in meta key words<br>norm freq of e in visual title<br>norm freq of e in bold font<br>norm freq of e in emphasized font<br>norm freq of e in italics<br>e is part of URL<br>e is in domain part of URL<br>e is in last part of URL |
| | Web graph | norm freq of e in out anchors<br>norm freq of e in in anchors |
| | Position | first offset of e<br>last offset of e<br>mean offset of e<br>standard deviation of offset of e<br>first offset of e in main content<br>last offset of e in main content<br>mean offset of e in main content<br>standard deviation of offset of e in main content |
| | Page segmentation | norm freq of e in several different page segments |

FIG. 2

IDENTIFYING SALIENT ITEMS IN DOCUMENTS

BACKGROUND

Social and entity experiences are increasingly integrated in commercial web search engines and portals. For example, if a user's friend has liked a review about a recently released movie, a search engine service (e.g., BING) may annotate a search result page with a photo of the user's friend when the user issues a query for that movie name. As another example, if the user browses a sports team, a search engine service may recommend content related to the team. For example, pertinent information may be displayed in a sidebar, including relationships of the team with other entities or items. For example, enabling technologies for these experiences may link people, entities (or items), and content in a "Web of Things" paradigm.

Not all of these links may be extracted with equal precision. For example, links between people and entities may be reliably obtained through social signals such as "likes." As another example, links between people and content may be mined from web search logs. However, many web pages (and other documents) may include a large number of entities or items, some of which may be substantially salient to the overall content of the pages or documents, and some of which may be less salient.

SUMMARY

According to one general aspect, a system may include a salient item identification engine. The salient item identification engine may include a log data acquisition component configured to obtain query data and corresponding click data that indicates web pages visited, in association with respectively corresponding user queries, based on information mined from a web search log. A soft labeling component may be configured to determine a salience annotation value of an item with respect to web pages, based on determining a first count of a total number of the user queries that are associated with one or more corresponding visits to the respective ones of the web pages, and determining a ratio of a second count to the first count, the second count determined as a cardinality of a subset of the corresponding visits that are associated with a group of the user queries that include the item, the subset included in the one or more corresponding visits.

According to another aspect, a first set of representations of a plurality of item-document pairs of items and respective documents that include the respective items may be obtained. Each of the representations may include a plurality of feature function values indicating weights associated with one or more features of the associated documents, the features including one or more document classification features associated with the associated documents. Training of one or more models may be initiated, based on the first set. Salience scores associated with respective ones of the items and associated ones of the documents may be obtained, the salience scores indicating a measure of salience of the respective items to the respective associated documents, based on the trained one or more models.

According to another aspect, a computer program product tangibly embodied on a computer-readable storage medium may include executable code that may cause at least one data processing apparatus to obtain a first set of representations of item-page pairs of items and respective web pages that include the respective items. Each of the representations may include feature function values indicating weights associated with one or more features of the associated web pages, the features including one or more page classification features associated with the associated web pages. Further, the at least one data processing apparatus may obtain an annotated set of labeled training data that is annotated with a plurality of salience annotation values of a plurality of the respective items for respective web pages that include content that includes the respective items. The salience annotation values may be determined based on a soft function, based on determining a first count of a total number of user queries that are associated with one or more corresponding visits to the respective web pages, and determining a ratio of a second count to the first count, the second count determined as a cardinality of a subset of the corresponding visits that are associated with a group of the user queries that include the item, the subset included in the one or more corresponding visits. Further, the at least one data processing apparatus may initiate training of one or more models based on the annotated set.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

FIG. 2 illustrates example features that may be used for training an example model.

DETAILED DESCRIPTION

I. Introduction

Figure 1:
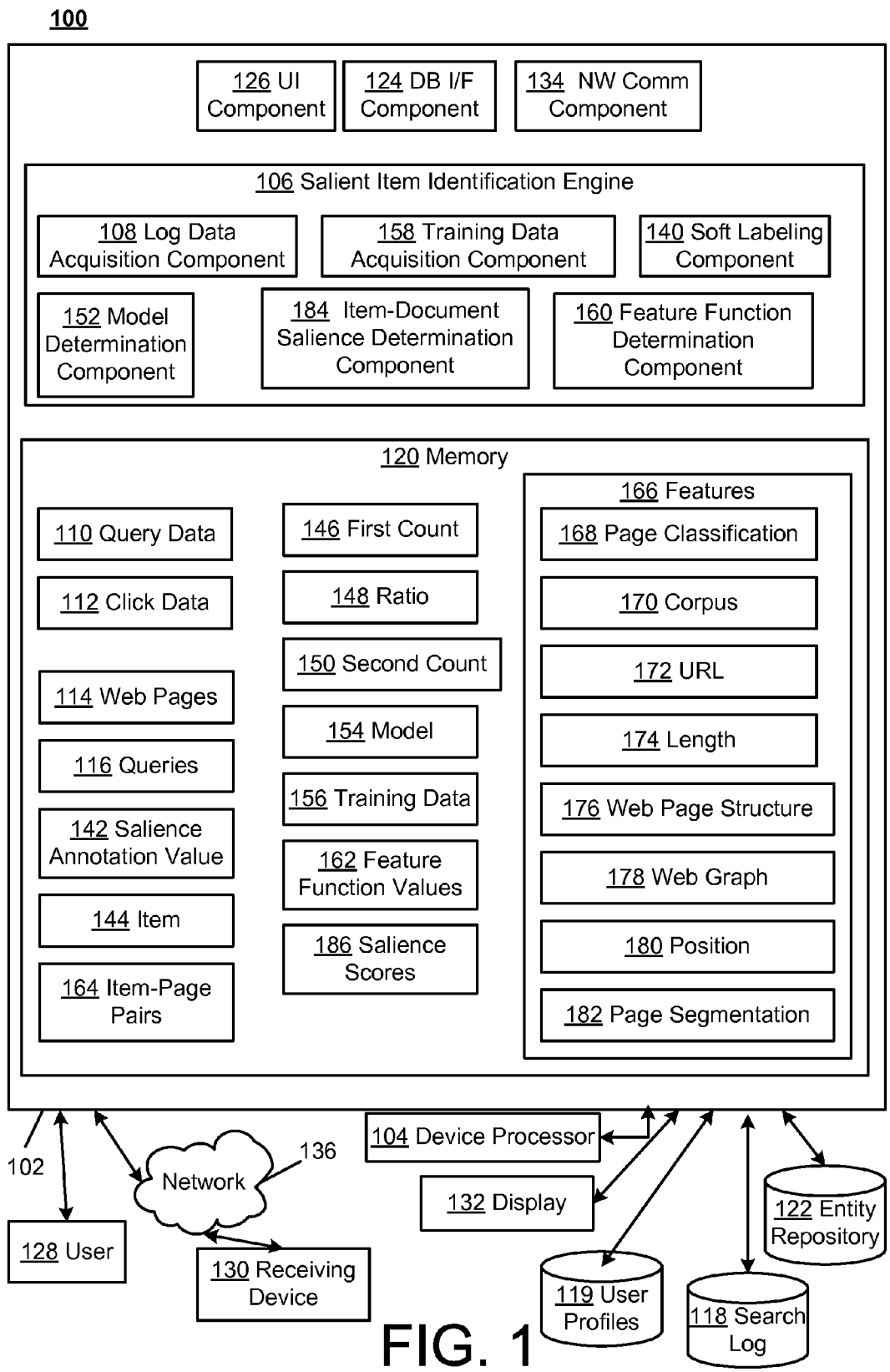
FIG. 1 is a block diagram of an example system for identifying item salience in documents.

Many recent advances in commercial search engines leverage the identification of entities, or items, in web pages. However, for many pages, only a small subset of entities are important, or central, to the document, which may lead to unacceptably low relevance for entity triggered experiences. Example techniques discussed herein may be used, for example, by a system that scores each entity, or item, on a web page (or other document) according to its centrality to the page (or document) content. As discussed herein, salience classification functions may incorporate various cues from document content, web search logs, user information logs, and a large web graph, as well as other sources of personalization information. One skilled in the art of data processing will understand that these are just a few examples, and that many other sources may provide cues for salience classification functions. To cost-effectively train the models, an example soft labeling technique may be used to generate a set of annotations based on user behaviors observed in web search logs. For example, human annotation cost may be minimized by using such automated techniques.

Many web pages contain a large number of entities. Named Entity Recognition systems, such as discussed in Finkel, et al., "Incorporating non-local information into information extraction systems by Gibbs sampling," *In Proceedings of the 43rd Annual Meeting on Association for Computational Linguistics* (ACL '05), 2005, pp. 363-370, and S. Cucerzan, "Large-scale named entity disambiguation based on wikipedia data," *In Proceedings of the 18th ACM conference on Information and Knowledge Management* (CIKM '09), 2009, pp. 215-224, may be generally effective at identifying entities on web pages. However, few of these entities may be salient to the web page. For example, a news story about the Syrian civil war may mention many entities, and only a few of them may be central to what the story is about. For example, Qatar may be mentioned as a location where a meeting between Syrian opposition groups took place, and the ASSOCIATED PRESS may be credited as the source of the story. "Qatar" and "The Associated Press" are peripheral to the story, i.e., not salient. In contrast, "Syria" and the name of the central opposition fighters in the story have high salience. Without a notion of salience, many irrelevant links may be established between entities and documents. In a social search experience such as the one presented on BING, if a user's friend has "liked" this article and the user queried for THE ASSOCIATED PRESS, it may be detrimental to the experience to present a social annotation with the friend's "like".

Knowing the salient entities, or items, in a web page (or other document) not only enables users to focus on the relevant edges between people and entities, it may also add edges from content to content, pivoting on entities and enabling pivot recommendations. In addition, new experiences are made possible such as stamping web documents with detailed entity cards for its salient entities, or items. For example, a user may also expect gains in conventional search by incorporating the entities or items as relevance features and by improving query-independent summaries via targeted sentence selection based on key entities. For example, such entity-centric (or item-centric) approaches may improve search results.

As used herein, an "entity" or "item" may include people, places, companies, as well as events, concepts, and famous dates. For example, a "thing" may be considered an "entity" or "item" if it has or reasonably could have a WIKIPEDIA or FACEBOOK page, or a GOOGLE KNOWLEDGE GRAPH entry associated with it.

As discussed further herein, scalable weakly-supervised models may be used for learning to rank and classify entities according to their salience to a document. For example, web search logs may be used to automatically acquire soft labels as a supervision signal for training data. For example, models may be trained on a large number of web pages, leveraging features from document content, page classifiers, and a web graph.

For example, entity salience, or item salience, may be used to frame a problem of understanding the "aboutness" of a document as determining the most salient entities, or items, in the document. For example, the task of entity salience detection may be modeled as a weakly supervised machine learned model, generating labeled training data via usage behaviors found in web search logs. For example, an aspect of document "aboutness" may include salient entities, i.e., those entities in a document that are central to its meaning.

D. Paranjpe, "Learning document aboutness from implicit user feedback and document structure," *In Proceedings of the 18th ACM conference on Information and Knowledge Management* (CIKM '09), 2009, pp. 365-374, discusses a focus on the detection of key terms in web pages. For example, web search log information is used for soft labeling of term salience that then serves as training data for a supervised salience scoring function.

Although example techniques discussed herein may use auto-labeling and supervised training techniques, there are several differences between these example techniques and those mentioned above.

Example techniques discussed herein involve a notion of document "aboutness" that is entity-centric, or item-centric, i.e., the example techniques herein involve the identification of salient entities (or salient items), as opposed to salient terms. Example techniques discussed herein may involve an example soft labeling technique that may be robust to effects of popularity and presentation order of Uniform Resource Locators (URLs) in the search engine results page (SERP). Further, an example significant feature set is discussed herein.

Example keyword extraction tasks may be considered as related to entity salience, where keywords and key phrases are a superset of salient entities in a document. Example techniques discussed herein may not use any features based on linguistic analysis due to the running time complexity of most analyses that would in turn make it difficult to process a large crawl of the web; however, it may be possible to incorporate such features in an example learning framework.

Another example approach to keyword extraction is purely based on term statistics, without recourse to more complex linguistic structure. For example, term frequency statistics and various term weighting schemes may be used to score the specificity, or importance, of a term in information retrieval. Example techniques discussed herein may incorporate a set of term and document frequency features in models, as well as extending it to other signal sources such as the web graph and search logs.

For example, supervised machine learning may be used to build models of entity salience. Machine learning offers a principled way to calibrate signals from heterogeneous sources, which may be advantageous when incorporating diverse (e.g. document content, term-weighting, web graph) insights into one system. However, a potential drawback of supervised learning is the cost of gathering "supervision", or annotation for training data. This may be noticeable for newer domains or newer tasks where annotated resources are to be created from scratch.

One example approach to obtain relevance-related supervision for web document training data is the use of web search logs: the click behavior that is recorded in these logs may serve as implicit user feedback and hence indicate relevance of a document to a user. For example, this information has been exploited as a surrogate for relevance annotation in document retrieval systems.

In accordance with example techniques discussed herein, web search logs may be exploited by using a soft labeling function for entity salience that is based on user behavior information in the logs. For example, this function may approximate entity salience and hence may be used as a supervision signal, in lieu of manual salience annotation.

As discussed herein, the salience of an entity or item may be determined by how the entity is presented within a document. Thus, entity salience, or item salience, may be effectively computed from a local context, or what is available in the document itself.

As discussed herein, entity salience, or item salience, may be assessed independently from the intentions or interests of its users/readers, and independently from the prior importance of the entity as it exists outside of the document. Alternatively, user intention/interest may also be used as well.

Entity salience is distinct from two other aspects of aboutness: entity importance and entity relevance. For example, the "importance" of an entity may refer to its influence or substantiveness outside of the scope of the document. For example, although Barack Obama is an important entity, he can be peripheral to some news stories. On the other hand, the relevance of an entity is inherently subjective to the reader's perspective and intent. For example, in an article about an expressionist art tour featuring Munch's The Scream, a reader's hometown may be perceived as significantly more relevant to her than to a non-resident reader.

Although local scoping suggests that the evidence for entity salience can be derived effectively from the document content, extra-document information such as incoming anchor links and user clickthrough data provide important information, and may be leveraged by models discussed herein. Also, if the source of salience is be local to a document, the search space may be limited to those entities or items in the document.

Using a local scoping assumption, any salient entity or salient item is included in its document. Thus, a system that is capable of identifying each entity in a document may serve as a candidate generator for a salience ranking system. In accordance with example techniques discussed herein, an NER system may be used, trained using an example perceptron algorithm, as discussed by M. Collins, "Discriminative training methods for hidden Markov models: theory and experiments with perceptron algorithms," *In Proceedings of the ACL-02 conference on Empirical methods in natural language processing*—Volume 10 (EMNLP '02), 2002, pp. 1-8.

For example, models may leverage signal not only from the document content, but also its domain, a web graph, and web search logs.

As discussed herein, D and E may denote the sets of all documents and entities (or items) on the web, respectively. For example, $E_d \subset E$ may denote the set of entities mentioned in d∈D. The "aboutness" task may be formally denoted as learning a function:

$$\sigma: D \times E \to \mathbb{R}$$

where σ(d, e) indicates the salience of e in d.

For example, the ranking of $E_d$ according to σ may be indicated as:

$$R^D_D = (e_1, \ldots, e_{|E_d|} | e_i \in E_d, \sigma(d, e_i) \geq \sigma(d, e_{i+1}))$$

where pairs of entities with tied scores may be ordered randomly.

For example, a ranking function may be denoted as $$R_\sigma: D \times E \to \mathbb{N}$$

such that $R_\sigma(d, e)$ equals the rank of e in $R_D^S$.

II. Example Operating Environment

Features discussed herein are provided as example embodiments that may be implemented in many different ways that may be understood by one of skill in the art of data processing, without departing from the spirit of the discussion herein. Such features are to be construed only as example embodiment features, and are not intended to be construed as limiting to only those detailed descriptions.

As further discussed herein, FIG. 1 is a block diagram of a system 100 for identifying item salience in documents. As shown in FIG. 1, a system 100 may include a device 102 that includes at least one processor 104. The device 102 includes a salient item identification engine 106 that may include a log data acquisition component 108 that may be configured to obtain query data 110 and corresponding click data 112 that indicates web pages 114 visited, in association with respectively corresponding user queries 116, based on information mined from a web search log 118. A user profile store 119 may serve interests and identity information for the features. For example, the query data 110 and corresponding click data 112 may be stored in a memory 120.

For example, the salient item identification engine 106, or one or more portions thereof, may include executable instructions that may be stored on a tangible computer-readable storage medium, as discussed below. For example, the computer-readable storage medium may include any number of storage devices, and any number of storage media types, including distributed devices.

For example, an entity repository 122 may include one or more databases, and may be accessed via a database interface component 124. One skilled in the art of data processing will appreciate that there are many techniques for storing repository information discussed herein, such as various types of database configurations (e.g., relational databases, hierarchical databases, distributed databases) and non-database configurations.

According to an example embodiment, the device 102 may include the memory 120 that may store the query data 110. In this context, a "memory" may include a single memory device or multiple memory devices configured to store data and/or instructions. Further, the memory 120 may span multiple distributed storage devices.

According to an example embodiment, a user interface component 126 may manage communications between a device user 128 and the salient item identification engine 106. The device 102 may be associated with a receiving device 130 and a display 132, and other input/output devices. For example, the display 132 may be configured to communicate with the device 102, via internal device bus communications, or via at least one network connection.

According to example embodiments, the display 132 may be implemented as a flat screen display, a print form of display, a two-dimensional display, a three-dimensional display, a static display, a moving display, sensory displays such as tactile output, audio output, and any other form of output for communicating with a user (e.g., the device user 128).

According to an example embodiment, the system 100 may include a network communication component 134 that may manage network communication between the salient item identification engine 106 and other entities that may communicate with the salient item identification engine 106 via at least one network 136. For example, the network 136 may include at least one of the Internet, at least one wireless network, or at least one wired network. For example, the network 136 may include a cellular network, a radio network, or any type of network that may support transmission of data for the salient item identification engine 106. For example, the network communication component 134 may manage network communications between the salient item identification engine 106 and the receiving device 130. For example, the network communication component 134 may manage network communication between the user interface component 126 and the receiving device 130.

In this context, a "processor" may include a single processor or multiple processors configured to process instructions associated with a processing system. A processor may thus include one or more processors processing instructions in parallel and/or in a distributed manner. Although the processor 104 is depicted as external to the salient item identification engine 106 in FIG. 1, one skilled in the art of data processing will appreciate that the processor 104 may be implemented as a single component, and/or as distributed units which may be located internally or externally to the salient item identification engine 106, and/or any of its elements.

For example, the system 100 may include one or more processors 104. For example, the system 100 may include at least one tangible computer-readable storage medium storing instructions executable by the one or more processors 104, the executable instructions configured to cause at least one data processing apparatus to perform operations associated with various example components included in the system 100, as discussed herein. For example, the one or more processors 104 may be included in the at least one data processing apparatus. One skilled in the art of data processing will understand that there are many configurations of processors and data processing apparatuses that may be configured in accordance with the discussion herein, without departing from the spirit of such discussion. For example, the data processing apparatus may include a mobile device.

In this context, a "component" may refer to instructions or hardware that may be configured to perform certain operations. Such instructions may be included within component groups of instructions, or may be distributed over more than one group. For example, some instructions associated with operations of a first component may be included in a group of instructions associated with operations of a second component (or more components).

The salient item identification engine 106 may include a soft labeling component 140 configured to determine a salience annotation value 142 of an item 144 for respective ones of the web pages 114, based on determining a first count 146 of a total number of the user queries 116 that are associated with one or more corresponding visits to the respective ones of the web pages 114, and determining a ratio 148 of a second count 150 to the first count 146, the second count 150 determined as a cardinality of a subset of the corresponding visits that are associated with a group of the user queries 116 that include the item 144, the subset included in the one or more corresponding visits.

For example, the soft labeling component 140 may be configured to determine the ratio 148 in accordance with Equation (1), indicated as:

$$\text{ratio}(e, d) = \frac{\text{clicks}(e, d)}{\sum_{q \in Q} \text{clicks}(q, d)} \quad (1)$$

wherein
  Q indicates a set of all user queries 110 represented in the web search log 118,
  e represents one of the items 144,
  d represents one of the web pages 114,
  clicks (q, d) represents a number of visits to d that are associated with a query q∈Q, and
  clicks (e, d) represents a number of visits to d that are associated with the group of the user queries 110 matching e.

For example, behavioral signals from web users may be used as a proxy for salience annotation. For example, mining a web search log from a commercial search engine, provides information on how users query for entities (or items) and which URLs they subsequently click on. For example, individual clicks indicate a user's interest in a URL based on their item query or entity query, i.e., they indicate the relevance of the item or entity in the URL to the user. In aggregate, the combined interests for an entity/URL pair may correlate with the entity or item being salient, since users are less likely to search for an item or entity and then examine a page that is not about that item or entity. For example, this "soft label" is available for pages that receive enough traffic to derive reliable user click statistics. In other words, this signal may be obtains predominantly for queries and URLs in the head of the distribution. However, while this is true for the supervision signal, the learned model may use features that are independent of user behavior, and hence it may generalize to the tail of the distribution.

As discussed herein, soft labeling may avoid issues of position bias, popularity and recency by aggregating over only the queries that lead to clicks on a URL without taking a number of views (CTR) or a number of skips (CA) into account. As discussed herein, Such a function may involve an assumption that a page that is about entity e will receive most of its clicks from queries about entity e. Thus, the item-query ration (or entity-query ratio) entity e and document d may be determined by considering all queries that lead to a click on d. Within that set of queries, the ratio of the number of clicks from queries that include e to the number of clicks from all queries may be determined. The notion of a query including an entity e may be defined in two ways. For example, a more restrictive notion involves the query and the entity being an exact match, and a softer notion involves the query including the entity, but potentially including other words.

For example, the soft label may generate a continuous value between 0 and 1. One skilled in the art of data processing will understand that there are many techniques for modeling the prediction of the value. For example, one solution for prediction of a continuous salience score is regression, i.e., a model that tries to fit a curve of predicted salience scores to the curve of observed (via soft label) salience. The modeling may also be cast as a ranking problem where the model's task is to rank the top n most salient entities (or items) in a page in the correct order. Additionally, a user may map the regression task into a binary classification task where each entity above a soft label threshold τ may be considered salient and otherwise non-salient.

This approach may lead to difficulties, however: the most advantageous τ may be determined and forcing a binary decision on a continuous label may not provide significant success when compared to a regression approach. Thus, for example, regression and ranking may be considered as appropriate learning tasks.

For both ranking and regression, boosted decision trees may be utilized, as discussed by J. H. Friedman, "Greedy function approximation: A gradient boosting machine," *Annals of Statistics*, 29:1189-1232, 1999.

This algorithm may be advantageous, as it has been widely used and yields high accuracy; it may not involve feature normalization; it may handle a mix of real-valued and binary features; and it may capture non-linearities between features. Example hyperparameters may include the number of iterations, learning rate, minimum instances in leaf nodes, and the number of leaves.

For example, a model determination component 152 may be configured to obtain a model 154 that is trained with training data 156 that includes representations of the item-page pairs that are annotated with labels that are based on a plurality of salience annotation values that include the salience annotation value 142, wherein the representations of the item-page pairs each include a plurality of the feature function values.

For example, the soft labeling component 140 may be configured to determine the salience annotation value 142 of the item 144 for respective ones of the web pages 114, based on determining a set of the user queries 116 that are associated with one or more corresponding visits to the respective web page, wherein the group of the user queries 116 that include the item 144 includes one or more of a group of the user queries 116 that substantially match the item 144, or exactly match the item 144, and that are included in the set, or a group of the user queries 116 that include the item 144 as a proper substring, and that are included in the set.

For example, the soft labeling component 140 may be configured to determine a plurality of salience annotation values 142 of a plurality of respective items 144 for respective ones of the web pages 114.

For example, a training data acquisition component 158 may be configured to obtain labeled training data 156 for model training, based on the determined plurality of salience annotation values 142.

For example, a model determination component 152 may be configured to obtain a supervised machine-learned model 154 that is trained offline with the labeled training data 156.

Each entity/document pair ⟨ e, d⟩ may be represented as a vector of features, for example, as listed in a table of features 200 in FIG. 2. For example, at a highest level, there are three distinct classes of features: (1) features (202) that are computed from properties of e and the whole document collection D, indicated as $F_{e,D}$; (2) features (204) that are solely computed from properties of d, indicated as $F_d$; and (3) features (206) that are computed from properties of e in d, indicated as $F_{e,d}$. Document features, $F_d$, further sub-divide into categorical features representing the page classification (168) of d, features of the document URL (172), and length features (174). Entity/document features (206), $F_{e,d}$, are subcategorized into structural features (176) that relate e to the structure of d, web graph features (178) that indicate the frequency of e in inlinks and outlinks, position features (180) that capture the location of e in d, and features (182) that capture the frequency of e, for example, in 17 different page segments that are automatically identified based on visual properties. For example, Cai, et al., "Extracting content structure for web pages based on visual representation," *Web Technologies and Applications,* 2003, pp. 406-417, discusses using such visual properties.

For example, a feature function determination component 160 may be configured to obtain feature function values 162 for respective item-page pairs 164 of the items 144 and associated web pages 114, the feature function values 162 indicating weights associated with one or more features 166 of the associated web pages 114. For example, the features include one or more page classification features 168 associated with the associated web pages 114.

For example, the features 166 may include one or more of corpus features 170, Uniform Resource Locator (URL) features 172, length features 174, web page structural features 176, web graph features 178 associated with the associated web pages, position features 180, or page segmentation features 182.

For example, the features 166 may include identity store, or user profile features and user interest features. For example, user interest features may include features such as "likes" from FACEBOOK or other social sources (e.g., TWITTER "tweets" and other sources). One skilled in the art of data processing will understand that there may be many other sources that may provide temporal saliency signals, without departing from the spirit of the discussion herein.

For example, a model determination component 152 may be configured to obtain a model 154 that is trained with training data 156 that includes representations of the item-page pairs 164 that are annotated with labels that are based on a plurality of salience annotation values that include the salience annotation value 142, wherein the representations of the item-page pairs each include a plurality of the feature function values 162.

For example, an item-document salience determination component 184 may be configured to obtain salience scores 186 associated with respective ones of the items 144 and associated ones of the web pages 114, the salience scores 186 indicating a measure of salience of the respective items 144 to the respective associated web pages 114, based on the trained model 154.

For example, the item-document salience determination component 184 may be configured to obtain the salience scores 186 based on data obtained from the supervised machine-learned model 154 and the feature function determination component 160.

III. Flowchart Description

Features discussed herein are provided as example embodiments that may be implemented in many different ways that may be understood by one of skill in the art of data processing, without departing from the spirit of the discussion herein. Such features are to be construed only as example embodiment features, and are not intended to be construed as limiting to only those detailed descriptions.

Figure 3A:
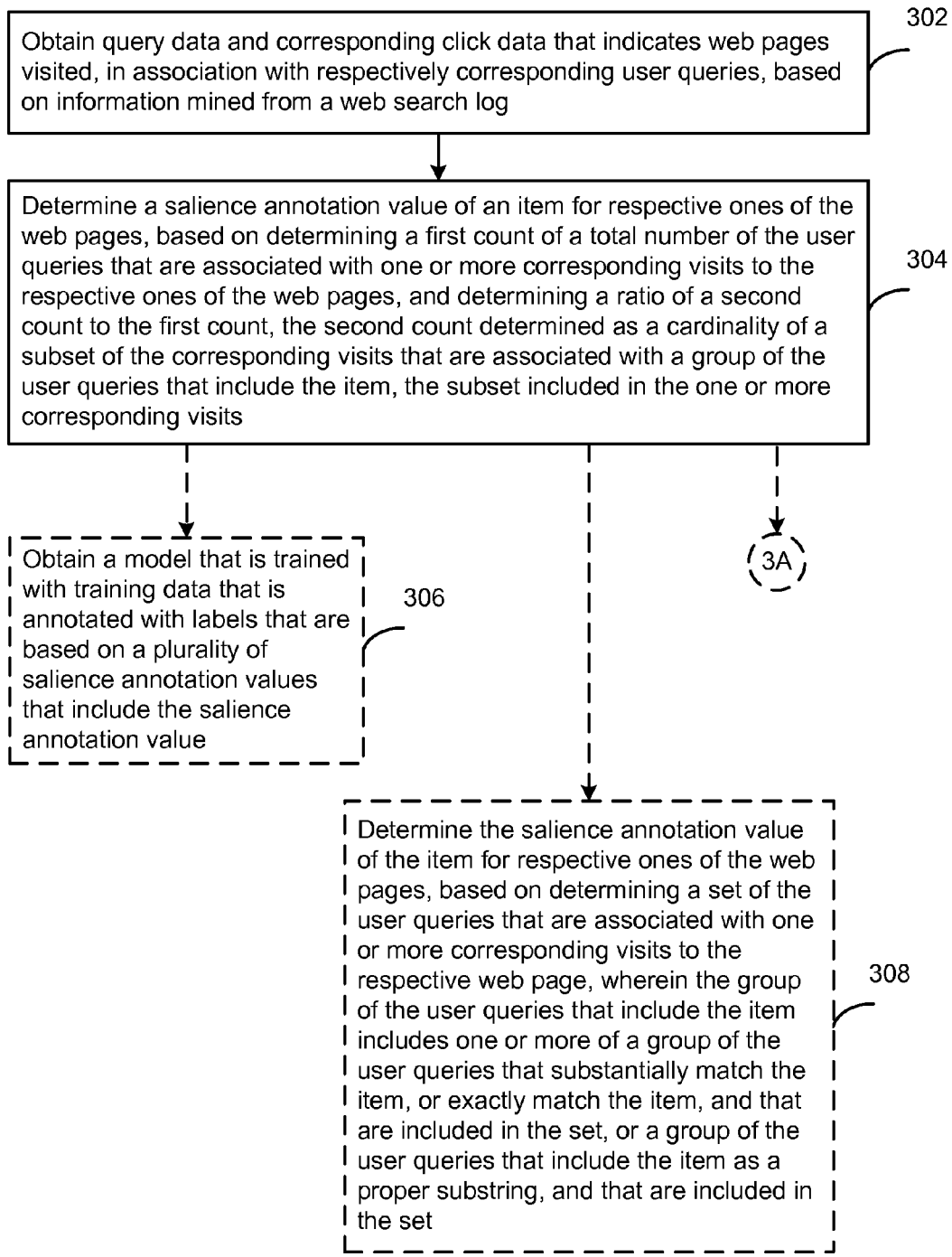
FIGS. 3a-3c are a flowchart illustrating example operations of the system of FIG. 1.
Figure 3B:
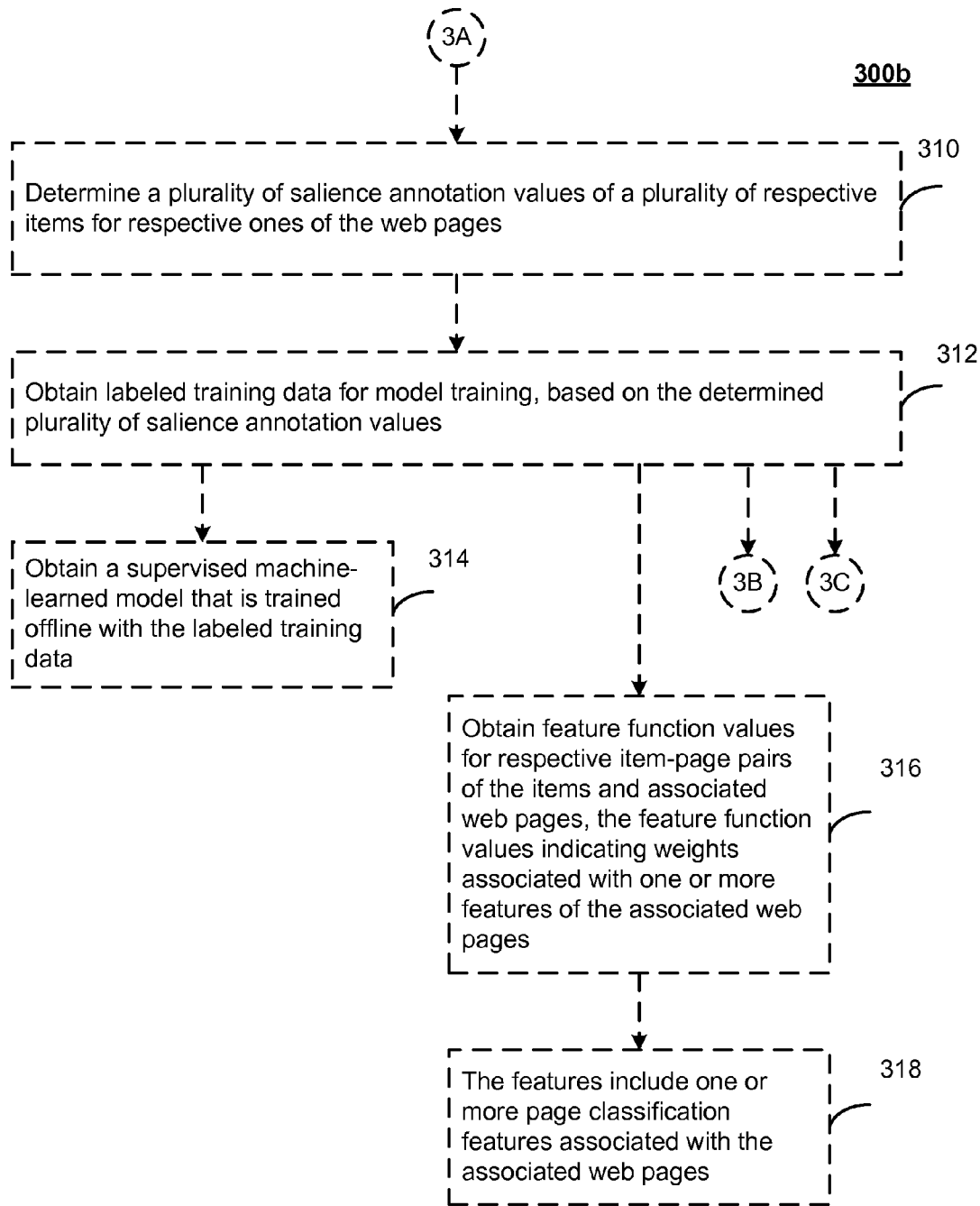

FIG. 3 is a flowchart illustrating example operations of the system of FIG. 1, according to example embodiments. In the example of FIG. 3a query data and corresponding click data that indicates web pages visited, in association with respectively corresponding user queries, may be obtained, based on information mined from a web search log (302). For example, the log data acquisition component 108 may obtain query data 110 and corresponding click data 112 that indicates web pages 114 visited, in association with respectively corresponding user queries 116, based on information mined from a web search log 118, as discussed above.

A salience annotation value of an item for respective ones of the web pages may be determined, based on determining a first count of a total number of the user queries that are associated with one or more corresponding visits to the respective ones of the web pages, and determining a ratio of a second count to the first count, the second count determined as a cardinality of a subset of the corresponding visits that are associated with a group of the user queries that include the item, the subset included in the one or more corresponding visits (304). For example, the soft labeling component 140 may determine a salience annotation value 142 of an item 144 for respective ones of the web pages 114, based on determining a first count 146 of a total number of the user queries 116 that are associated with one or more corresponding visits to the respective ones of the web pages 114, and determining a ratio 148 of a second count 150 to the first count 146, the second count 150 determined as a cardinality of a subset of the corresponding visits that are associated with a group of the user queries 116 that include the item 144, the subset included in the one or more corresponding visits, as discussed above.

For example, a model may be obtained that is trained with training data that is annotated with labels that are based on a plurality of salience annotation values that include the salience annotation value (306). For example, the model determination component 152 may obtain the model 154 that is trained with training data 156 that is annotated with labels that are based on a plurality of salience annotation values that include the salience annotation value 142, as discussed above.

For example, the salience annotation value of the item for respective ones of the web pages may be determined, based on determining a set of the user queries that are associated with one or more corresponding visits to the respective web page, wherein the group of the user queries that include the item includes one or more of a group of the user queries that substantially match the item, or exactly match the item, and that are included in the set, or a group of the user queries that include the item as a proper substring, and that are included in the set (308). For example, the soft labeling component 140 may be configured to determine the salience annotation value 142 of the item 144 for respective ones of the web pages 114, based on determining a set of the user queries 116 that are associated with one or more corresponding visits to the respective web page, wherein the group of the user queries 116 that include the item 144 includes one or more of a group of the user queries 116 that substantially match the item 144, or exactly match the item 144, and that are included in the set, or a group of the user queries 116 that include the item 144 as a proper substring, and that are included in the set, as discussed above.

Figure 4A:
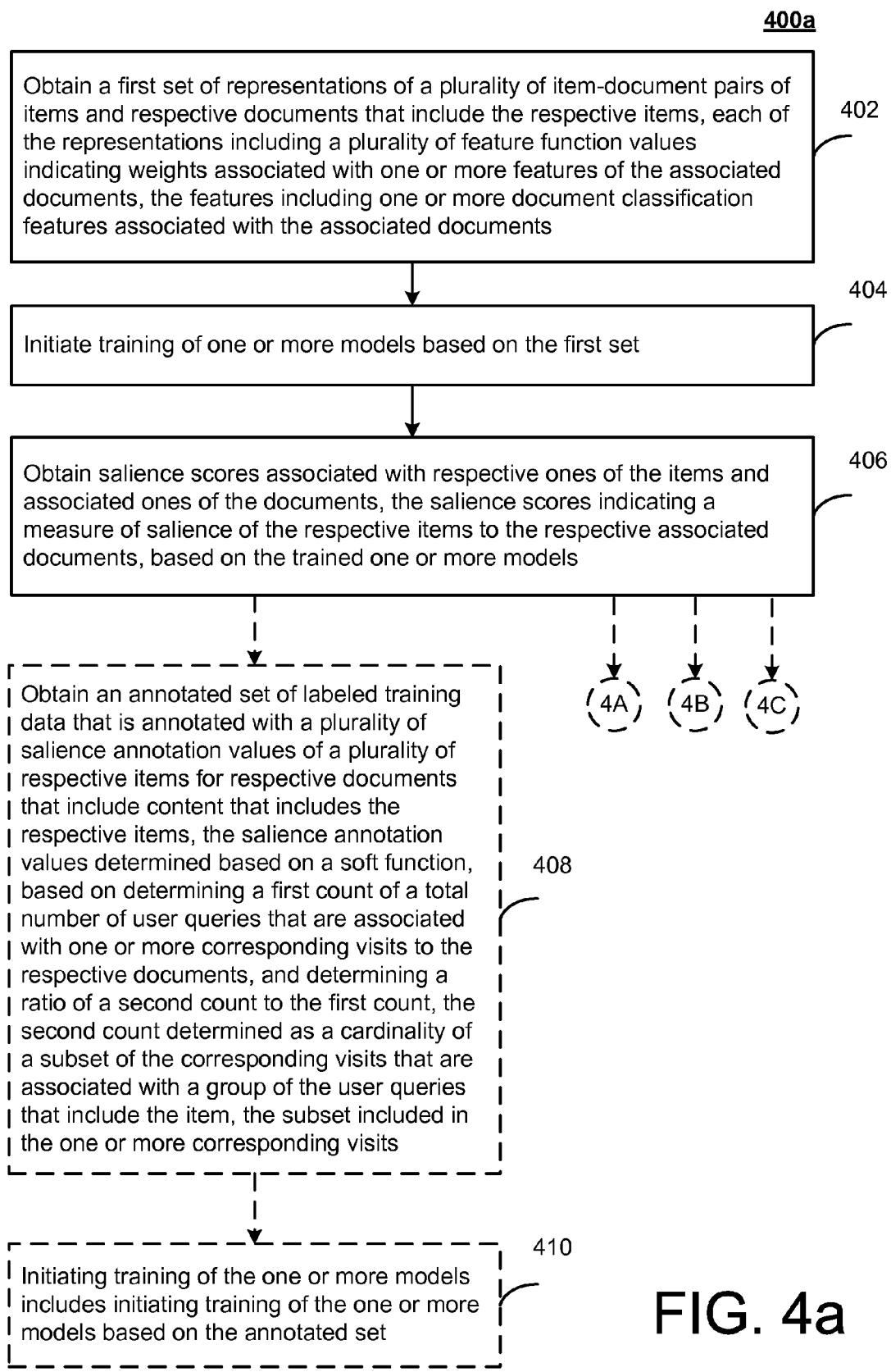
FIGS. 4a-4c are a flowchart illustrating example operations of the system of FIG. 1.
Figure 4B:
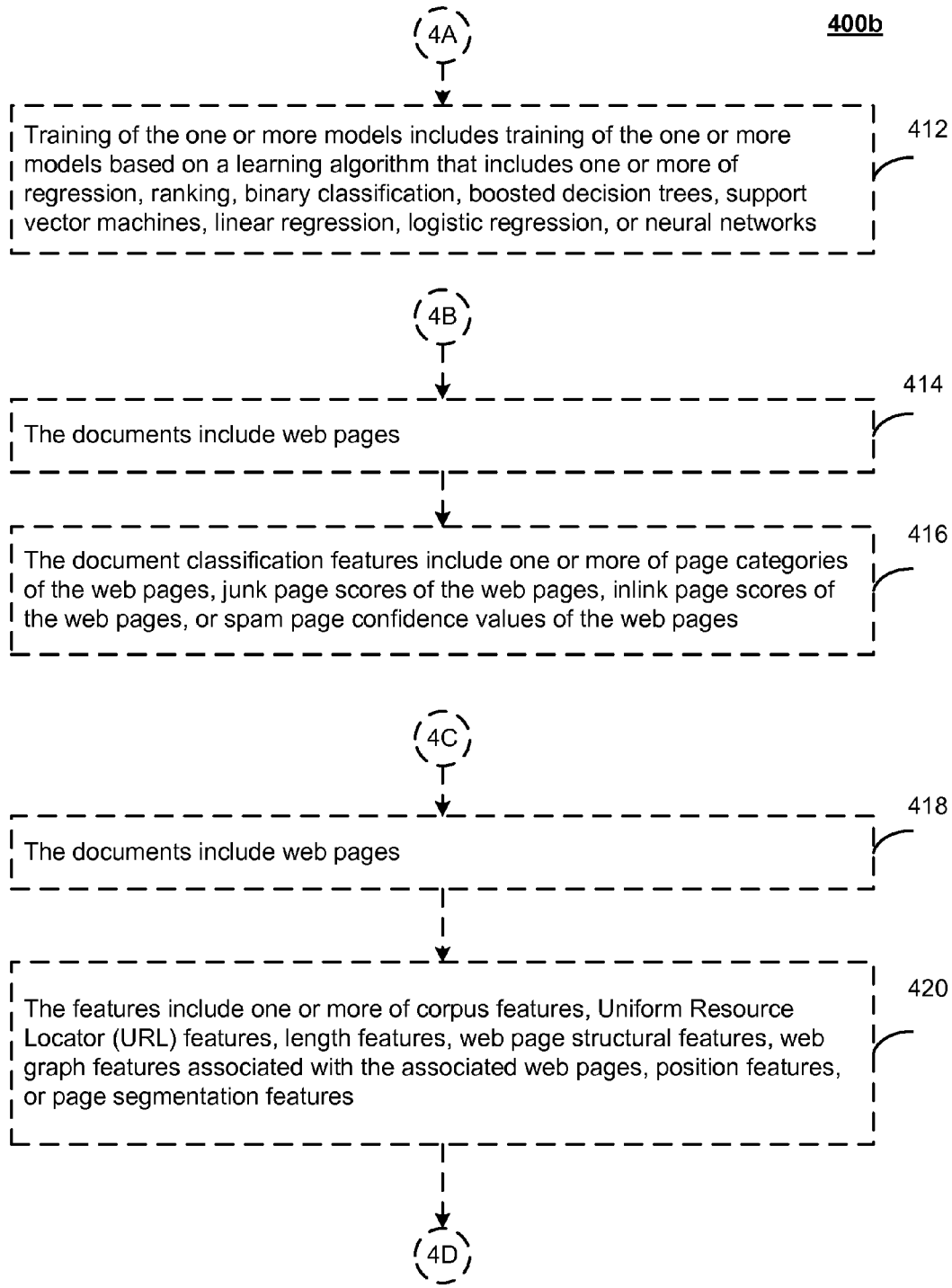

For example, a plurality of salience annotation values of a plurality of respective items for respective ones of the web pages may be determined (310), in the example of FIG. 4b. For example, the soft labeling component 140 may determine a plurality of salience annotation values 142 of a plurality of respective items 144 for respective ones of the web pages 114, as discussed above.

For example, labeled training data for model training may be obtained, based on the determined plurality of salience annotation values (312). For example, the training data acquisition component 158 may obtain labeled training data 156 for model training, based on the determined plurality of salience annotation values 142, as discussed above.

For example, a supervised machine-learned model may be obtained that is trained offline with the labeled training data (314). For example, the model determination component 152 may obtain a supervised machine-learned model 154 that is trained offline with the labeled training data 156, as discussed above.

For example, feature function values for respective item-page pairs of the items and associated web pages may be obtained, the feature function values indicating weights associated with one or more features of the associated web pages (316). For example, the feature function determination component 160 may obtain feature function values 162 for respective item-page pairs 164 of the items 144 and associated web pages 114, the feature function values 162 indicating weights associated with one or more features 166 of the associated web pages 114. For example, the features include one or more page classification features 168 associated with the associated web pages 114, as discussed above.

For example, the features may include one or more page classification features associated with the associated web pages (318).

Figure 3C:
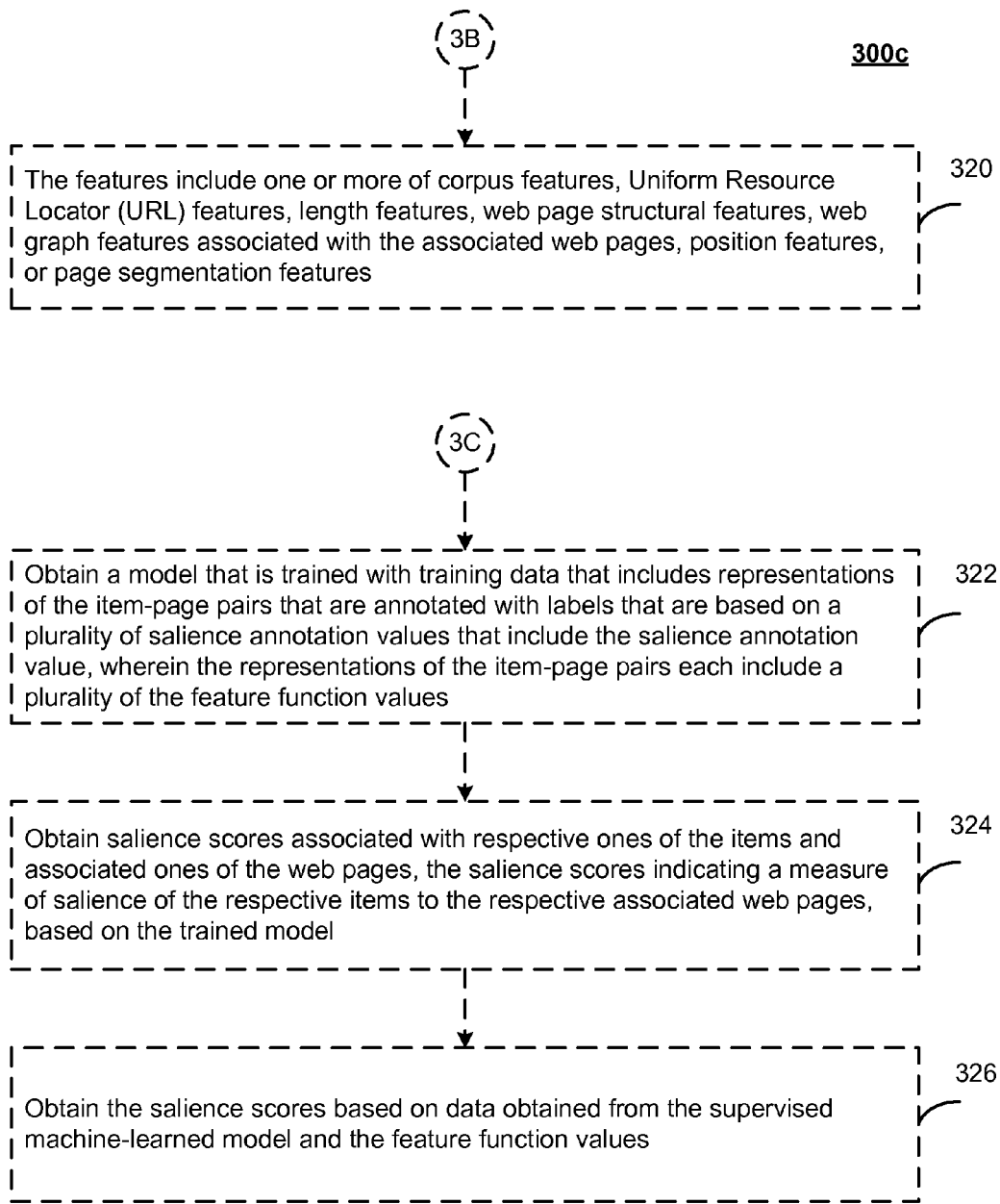

For example, the features may include one or more of corpus features, Uniform Resource Locator (URL) features, length features, web page structural features, web graph features associated with the associated web pages, position features, or page segmentation features (320), in the example of FIG. 3c.

For example, a model may be obtained that is trained with training data that includes representations of the item-page pairs that are annotated with labels that are based on a plurality of salience annotation values that include the salience annotation value, wherein the representations of the item-page pairs each include a plurality of the feature function values (322). For example, the model determination component 152 may obtain a model 154 that is trained with the training data 156, as discussed above.

For example, salience scores associated with respective ones of the items and associated ones of the web pages may be obtained, the salience scores indicating a measure of salience of the respective items to the respective associated web pages, based on the trained model (324). For example, the item-document salience determination component 184 may obtain salience scores 186 associated with respective ones of the items 144 and associated ones of the web pages 114, the salience scores 186 indicating a measure of salience of the respective items 144 to the respective associated web pages 114, based on the trained model 154, as discussed above.

For example, the salience scores may be obtained based on data obtained from the supervised machine-learned model and the feature function values (326). For example, the item-document salience determination component 184 may obtain the salience scores 186 based on data obtained from the supervised machine-learned model 154 and the feature function determination component 160, as discussed above.

FIG. 4 is a flowchart illustrating example operations of the system of FIG. 1, according to example embodiments. In the example of FIG. 4a, a first set of representations of a plurality of item-document pairs of items and respective documents that include the respective items may be obtained, each of the representations including a plurality of feature function values indicating weights associated with one or more features of the associated documents, the features including one or more document classification features associated with the associated documents (402). For example, the representations of the item-page pairs 164 may be obtained, as discussed above.

Training of one or more models may be initiated, based on the first set (404). Salience scores associated with respective ones of the items and associated ones of the documents may be obtained, the salience scores indicating a measure of salience of the respective items to the respective associated documents, based on the trained one or more models (406).

For example, an annotated set of labeled training data that is annotated with a plurality of salience annotation values of a plurality of respective items for respective documents that include content that includes the respective items may be obtained, the salience annotation values determined based on a soft function, based on determining a first count of a total number of user queries that are associated with one or more corresponding visits to the respective documents, and determining a ratio of a second count to the first count, the second count determined as a cardinality of a subset of the corresponding visits that are associated with a group of the user queries that include the item, the subset included in the one or more corresponding visits (408), as discussed above.

For example, initiating training of the one or more models may include initiating training of the one or more models based on the annotated set (410).

For example, training of the one or more models may include training of the one or more models based on a learning algorithm that includes one or more of regression, ranking, binary classification, boosted decision trees, support vector machines, linear regression, logistic regression, or neural networks (412), in the example of FIG. 4b.

For example, the documents may include web pages (414).

For example, the document classification features may include one or more of page categories of the web pages, junk page scores of the web pages, inlink page scores of the web pages, or spam page confidence values of the web pages (416).

For example, the documents may include web pages (418).

For example, the features may include one or more of corpus features, Uniform Resource Locator (URL) features, length features, web page structural features, web graph features associated with the associated web pages, position features, or page segmentation features (420).

Figure 4C:
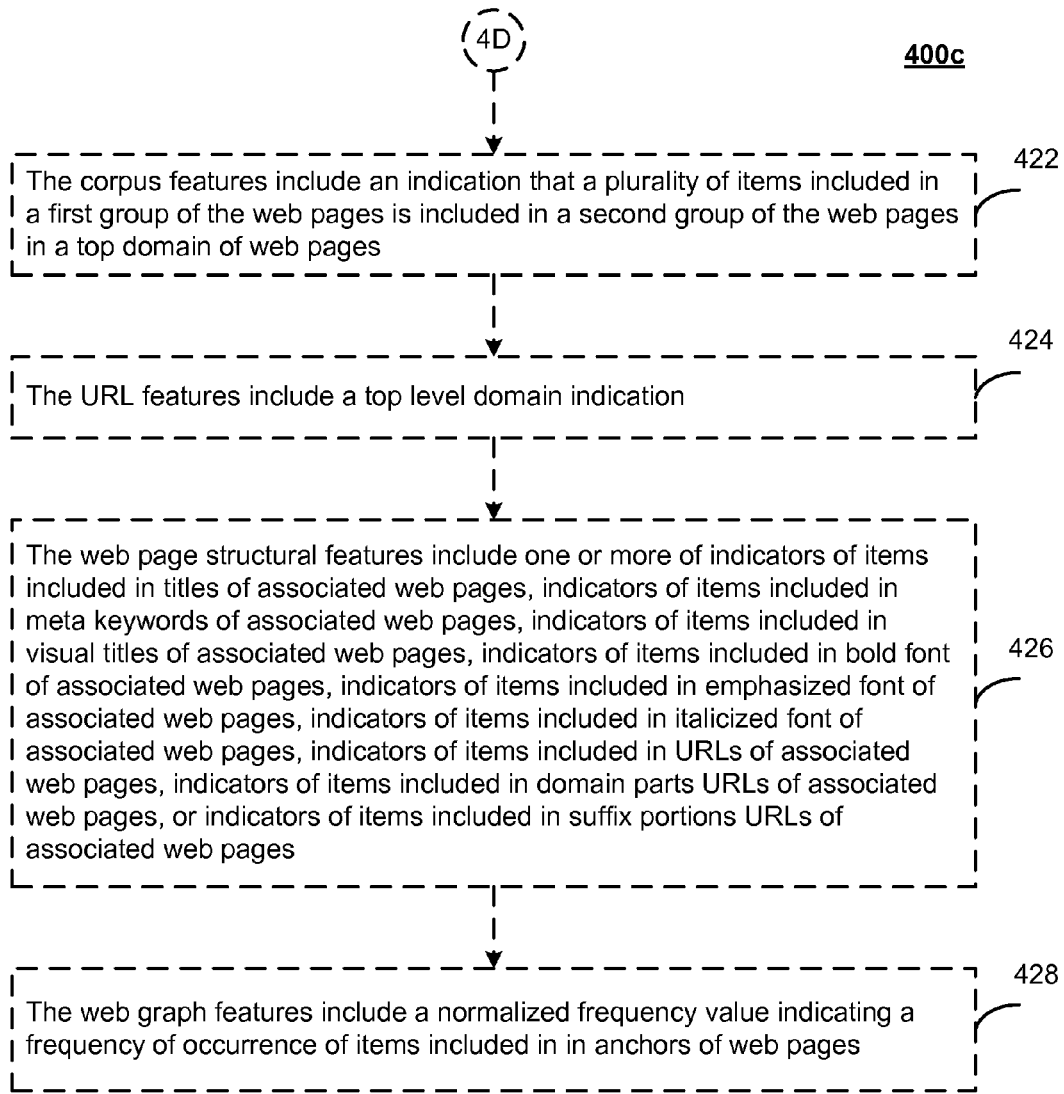

For example, the corpus features may include an indication that a plurality of items included in a first group of the web pages is included in a second group of the web pages in a top domain of web pages (422), in the example of FIG. 4c.

For example, the URL features may include a top level domain indication (424).

For example, the web page structural features may include one or more of indicators of items included in titles of associated web pages, indicators of items included in meta keywords of associated web pages, indicators of items included in visual titles of associated web pages, indicators of items included in bold font of associated web pages, indicators of items included in emphasized font of associated web pages, indicators of items included in italicized font of associated web pages, indicators of items included in URLs of associated web pages, indicators of items included in domain parts URLs of associated web pages, or indicators of items included in suffix portions URLs of associated web pages (426).

For example, the web graph features may include a normalized frequency value indicating a frequency of occurrence of items included in in anchors of web pages (428).

Figure 5:
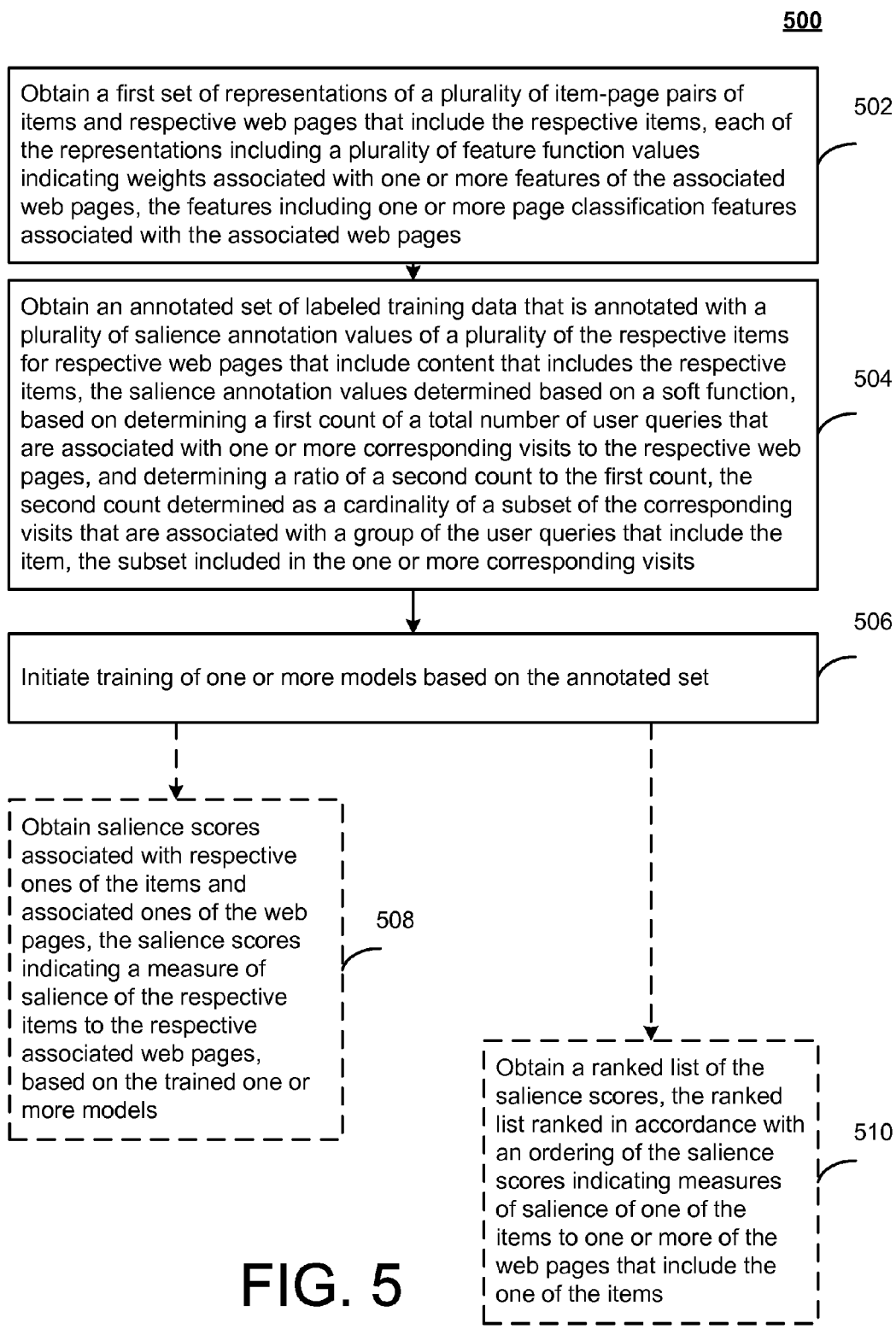
FIG. 5 is a flowchart illustrating example operations of the system of FIG. 1.

FIG. 5 is a flowchart illustrating example operations of the system of FIG. 1, according to example embodiments. In the example of FIG. 5, a first set of representations of a plurality of item-page pairs of items and respective web pages that include the respective items may be obtained (502). Each of the representations may include a plurality of feature function values indicating weights associated with one or more features of the associated web pages, the features including one or more page classification features associated with the associated web pages. For example, the feature function determination component 160 may be configured to obtain feature function values 162 for respective item-page pairs 164 of the items 144 and associated web pages 114, the feature function values 162 indicating weights associated with one or more features 166 of the associated web pages 114, as discussed above.

An annotated set of labeled training data that is annotated with a plurality of salience annotation values of a plurality of the respective items for respective web pages that include content that includes the respective items may be obtained (504). The salience annotation values may be determined based on a soft function, based on determining a first count of a total number of user queries that are associated with one or more corresponding visits to the respective web pages, and determining a ratio of a second count to the first count, the second count determined as a cardinality of a subset of the corresponding visits that are associated with a group of the user queries that include the item, the subset included in the one or more corresponding visits.

For example, the feature function determination component 160 may be configured to obtain feature function values 162 for respective item-page pairs 164 of the items 144 and associated web pages 114, the feature function values 162 indicating weights associated with one or more features 166 of the associated web pages 114, as discussed above.

Training of one or more models may be initiated, based on the annotated set (506).

For example, salience scores associated with respective ones of the items and associated ones of the web pages may be obtained, the salience scores indicating a measure of salience of the respective items to the respective associated web pages, based on the trained one or more models (508). For example, the item-document salience determination component 184 may obtain salience scores 186 associated with respective ones of the items 144 and associated ones of the web pages 114, the salience scores 186 indicating a measure of salience of the respective items 144 to the respective associated web pages 114, based on the trained model 154.

For example, a ranked list of the salience scores may be obtained, the ranked list ranked in accordance with an ordering of the salience scores indicating measures of salience of one of the items to one or more of the web pages that include the one of the items (510).

One skilled in the art of data processing will understand that there are many ways of determining item salience for documents, without departing from the spirit of the discussion herein.

Customer privacy and confidentiality have been ongoing considerations in data processing environments for many years. Thus, example techniques discussed herein may use user input and/or data provided by users who have provided permission via one or more subscription agreements (e.g., "Terms of Service" (TOS) agreements) with associated applications or services associated with queries and documents. For example, users may provide consent to have their input/data transmitted and stored on devices, though it may be explicitly indicated (e.g., via a user accepted text agreement) that each party may control how transmission and/or storage occurs, and what level or duration of storage may be maintained, if any.

Implementations of the various techniques described herein may be implemented in digital electronic circuitry, or in computer hardware, firmware, software, or in combinations of them (e.g., an apparatus configured to execute instructions to perform various functionality).

Implementations may be implemented as a computer program embodied in a pure signal such as a pure propagated signal. Such implementations may be referred to herein as implemented via a "computer-readable transmission medium."

Alternatively, implementations may be implemented as a computer program embodied in a machine usable or machine readable storage device (e.g., a magnetic or digital medium such as a Universal Serial Bus (USB) storage device, a tape, hard disk drive, compact disk, digital video disk (DVD), etc.), for execution by, or to control the operation of, data processing apparatus, e.g., a programmable processor, a computer, or multiple computers. Such implementations may be referred to herein as implemented via a "computer-readable storage medium" or a "computer-readable storage device" and are thus different from implementations that are purely signals such as pure propagated signals.

A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code (e.g., executable instructions) on a machine usable or machine readable storage device (e.g., a computer-readable storage medium). A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output.

The one or more programmable processors may execute instructions in parallel, and/or may be arranged in a distributed configuration for distributed processing. Example functionality discussed herein may also be performed by, and an apparatus may be implemented, at least in part, as one or more hardware logic components. For example, and without limitation, illustrative types of hardware logic components that may be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback. For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, gestures, and machine intelligence. Example NUI technologies may include, but are not limited to, touch sensitive displays, voice and speech recognition, intention and goal understanding, motion gesture detection using depth cameras (e.g., stereoscopic camera systems, infrared camera systems, RGB (red, green, blue) camera systems and combinations of these), motion gesture detection using accelerometers/gyroscopes, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
a device that includes at least one processor, and a computer readable storage medium storing instructions for execution by the at least one processor, for implementing a salient item identification engine that:
obtains query data and corresponding click data that indicates web pages visited, in association with respectively corresponding user queries, based on information mined from a web search log; and
determines a salience annotation value of an item for respective ones of the web pages, based on determining a first count of a total number of the user queries that are associated with one or more corresponding visits to the respective ones of the web pages, and determining a ratio of a second count to the first count, the second count determined as a cardinality of a subset of the corresponding visits that are associated with a group of the user queries that include the item, the subset included in the one or more corresponding visits.

2. The system of claim 1, wherein:
determining the ratio includes determining the ratio in accordance with $$\text{ratio}(e, d) = \frac{\text{clicks}(e, d)}{\sum_{q \in Q} \text{clicks}(q, d)}$$

wherein
Q indicates a set of all user queries represented in the web search log,
e represents one of the items,
d represents one of the web pages,
clicks (q, d) represents a number of visits to d that are associated with a query q∈Q, and clicks (e, d) represents a number of visits to d that are associated with the group of the user queries matching e.

3. The system of claim 1,
wherein the salient item identification engine obtains a model that is trained with training data that is annotated with labels that are based on a plurality of salience annotation values that include the salience annotation value.

4. The system of claim 1, wherein:
the salient item identification engine determines the salience annotation value of the item for respective ones of the web pages, based on determining a set of the user queries that are associated with one or more corresponding visits to the respective web page, wherein the group of the user queries that include the item includes one or more of:
   a group of the user queries that substantially match the item, or exactly match the item, and that are included in the set, or
   a group of the user queries that include the item as a proper substring, and that are included in the set.

5. The system of claim 1, wherein:
the salient item identification engine determines a plurality of salience annotation values of a plurality of respective items for respective ones of the web pages,
and obtains labeled training data for model training, based on the determined plurality of salience annotation values.

6. The system of claim 5,
wherein the salient item identification engine obtains a supervised machine-learned model that is trained offline with the labeled training data.

7. The system of claim 5,
wherein the salient item identification engine obtains feature function values for respective item-page pairs of the items and associated web pages, the feature function values indicating weights associated with one or more features of the associated web pages, wherein:
the features include one or more page classification features associated with the associated web pages.

8. The system of claim 7, wherein:
the features include one or more of:
   corpus features,
   Uniform Resource Locator (URL) features,
   length features,
   web page structural features,
   web graph features associated with the associated web pages,
   user profile features,
   user interest features,
   position features, or
   page segmentation features.

9. The system of claim 7,
wherein the salient item identification engine obtains a model that is trained with training data that includes representations of the item-page pairs that are annotated with labels that are based on a plurality of salience annotation values that include the salience annotation value, wherein the representations of the item-page pairs each include a plurality of the feature function values.

10. The system of claim 9,
wherein the salient item identification engine obtains salience scores associated with respective ones of the items and associated ones of the web pages, the salience scores indicating a measure of salience of the respective items to the respective associated web pages, based on the trained model.

11. The system of claim 10, wherein:
the salient item identification engine obtains the salience scores based on data obtained from the supervised machine-learned model and the feature function determination component.

12. A method comprising:
obtaining a first set of representations of a plurality of item-document pairs of items and respective documents that include the respective items, each of the representations including a plurality of feature function values indicating weights associated with one or more features of the associated documents, the features including one or more document classification features associated with the associated documents;
obtaining an annotated set of labeled training data that is annotated with a plurality of salience annotation values of a plurality of respective items for respective documents that include content that includes the respective items, the salience annotation values determined based on a soft function, based on determining a first count of a total number of user queries that are associated with one or more corresponding visits to the respective documents, and determining a ratio of a second count to the first count, the second count determined as a cardinality of a subset of the corresponding visits that are associated with a group of the user queries that include the item, the subset included in the one or more corresponding visits; and
initiating, via a device processor, training of one or more models based on the annotated set.

13. The method of claim 12, further comprising:
obtaining salience scores associated with respective ones of the items and associated ones of the documents, the salience scores indicating a measure of salience of the respective items to the respective associated documents, based on the trained one or more models.

14. The method of claim 12, wherein:
training of the one or more models includes training of the one or more models based on a learning algorithm that includes one or more of:
   regression,
   ranking,
   binary classification,
   boosted decision trees,
   support vector machines,
   linear regression,
   logistic regression, or
   neural networks.

15. The method of claim 12, wherein:
the documents include web pages, and
the document classification features include one or more of:
   page categories of the web pages,
   junk page scores of the web pages,
   inlink page scores of the web pages, or
   spam page confidence values of the web pages.

16. The method of claim 12, wherein:
the documents include web pages, and
the features include one or more of:
   corpus features,
   Uniform Resource Locator (URL) features,
   length features,
   web page structural features,
   web graph features associated with the associated web pages,
   user profile features,
   user interest features, position features, or page segmentation features.

17. The method of claim 12, wherein:

the documents include web pages, and the features include one or more of:

corpus features, the corpus features including an indication that a plurality of items included in a first group of the web pages is included in a second group of the web pages in a top domain of web pages;

Uniform Resource Locator (URL) features, the URL features including a top level domain indication;

web page structural features, the web page structural features including one or more of:

indicators of items included in titles of associated web pages, indicators of items included in meta keywords of associated web pages, indicators of items included in visual titles of associated web pages, indicators of items included in bold font of associated web pages, indicators of items included in emphasized font of associated web pages, indicators of items included in italicized font of associated web pages, indicators of items included in URLs of associated web pages, indicators of items included in domain parts URLs of associated web pages, or indicators of items included in suffix portions URLs of associated web pages; or web graph features associated with the associated web pages, the web graph features including a normalized frequency value indicating a frequency of occurrence of items included in anchors of web pages.

18. A computer program product comprising a hardware computer-readable storage medium storing including executable instructions that, when executed, cause at least one data processing apparatus to:

obtain a first set of representations of a plurality of item-page pairs of items and respective web pages that include the respective items, each of the representations including a plurality of feature function values indicating weights associated with one or more features of the associated web pages, the features including one or more page classification features associated with the associated web pages; and obtain an annotated set of labeled training data that is annotated with a plurality of salience annotation values of a plurality of the respective items for respective web pages that include content that includes the respective items, the salience annotation values determined based on a soft function, based on determining a first count of a total number of user queries that are associated with one or more corresponding visits to the respective web pages, and determining a ratio of a second count to the first count, the second count determined as a cardinality of a subset of the corresponding visits that are associated with a group of the user queries that include the item, the subset included in the one or more corresponding visits; and initiate training of one or more models based on the annotated set.

19. The computer program product of claim 18, wherein the executable instructions, when executed, cause the at least one data processing apparatus to:

obtain salience scores associated with respective ones of the items and associated ones of the web pages, the salience scores indicating a measure of salience of the respective items to the respective associated web pages, based on the trained one or more models.

20. The computer program product of claim 19, wherein the executable instructions, when executed, cause the at least one data processing apparatus to:

obtain a ranked list of the salience scores, the ranked list ranked in accordance with an ordering of the salience scores indicating measures of salience of one of the items to one or more of the web pages that include the one of the items.

* * * * *